July 30, 1940.   F. C. HOOVER   2,209,891

MULCHING VENTILATION SYSTEM AND APPARATUS

Filed Aug. 21, 1939

INVENTOR:
FRED C. HOOVER,
BY: Horace S. Woodward
ATTORNEY

Patented July 30, 1940

2,209,891

UNITED STATES PATENT OFFICE 2,209,891

MULCHING VENTILATION SYSTEM AND APPARATUS

Fred C. Hoover, Uniontown, Pa.

Application August 21, 1939, Serial No. 291,265

13 Claims. (Cl. 47—32)

The invention relates to means and methods for protecting plants against winter-killing and other damage, and by this it is not meant to protect the plants against freezing temperatures, but to protect them against the effects of unseasonable warmth by which early growth might be provoked, to be killed by a subsequent freeze or frost before the opening of the normal growing season.

The invention will be useful in this respect with a great many different plants, shrubs, and trees, but has especial value as at present embodied in the rose-growing industry, both commercial and domestic or home garden type.

It is also an object to present a device adapted to use in mulching and which may also be utilized for the release therein and confinement to a root area, of toxic gases or fumes for extermination of insect and rodent pests.

An important aim of the invention is to economize the time and labor and material required in mulching, to the end that very cheap materials produced and available on the ordinary farm or grounds may be used, such as leaves and other material, although still other material such as straw, moss, etc., may also be used where desired.

One of the important aims of the invention is to present a construction in a device applicable to use around plant stalks and trunks of trees, to support the mulch; which will by its structure have the effect of discouraging nesting of rodents such as mice, at the bases of stalks and trunks of trees and also discourage the propagation and wintering of insects at the bases of the stalks or trunks.

In the attainment of the foregoing ends it is also an important purpose to present an article which may be constructed cheaply and sold at a low cost, which may be readily stored, transported, and applied to plants, and which will be durable and adapted to repeated use year after year without objectionable deterioration or impairment of its effectiveness.

Another important desideratum of the invention is to present means whereby the fermentation of the mulch (which is usually accompanied by heat) will be prevented, and whereby the rotting or packing of the mulch upon the ground around a plant is prevented, as well as the effectiveness of the mulch as an insulation enhanced generally. Mulch that packs around the plant on the ground surface is especially dangerous to plants that retain a crown of foliage, or plants that have a soft root crown (notably roses) by favoring fungus growth and rot of various kinds. The packed mulch in such case becomes saturated with water, and itself decomposes and ferments. In fermenting it develops heat which will tend to provoke premature plant activity, and in addition, the packed wet mulch is a better conductor of the sun's heat, tending to promote thawing of the ground in which the roots of the protected plant are embedded, with resultant premature stimulation of growth. Or, if the ground is not thawed, the warmed packed mulch with its high moisture content will provoke rootlet growth in the higher parts of the stock above the frozen ground with resultant flow of sap to the plant stalks in advance of the proper season. Such stimulations may occur by the effects of a warm spell extending over a few days, such as a "January thaw," or may occur from the effects of the sun's rays during the day, which may be followed by freezing the night following.

The invention also contributes benefits by minimizing the liability or likelihood of "thawing" and formation of air cavities around the roots of plants, which expose them to likelihood of subsequent killing by following freezes, frosts, or access of insects.

The heaving due to alternate freezing and thawing of the ground around the plant roots is one of the principal causes of winter killing; another principal cause being the premature rise of sap and subsequent freezing, which also accompanies alternated thawing and freezing temperatures. These effects may occur at any time during the winter, or in the spring, and, with the rotting of root crowns, promotion of insect propagation and rodent injuries, result in a notably high loss through winter killing and other losses in the rose growing industry.

The losses of rose plants among the domestic or amateur gardeners is exceptionally high, resulting in the need for production of about twenty-five million plants annually by the nurserymen of the United States. Notwithstanding this large scale production, it has been estimated that cultivated rose plants growing in the United States at the present writing are in the neighborhood of only one hundred million (100,000,000) in number. This represents a high loss, since the normal plant may be maintained for many years in favorable conditions. The high loss is due to the fact that one-half or more of the plants sold to the household gardeners are winter-killed in the first or second year after planting, and that the commercial growers suffer heavy losses through winter killing from some of the causes above indicated, notwithstanding great expenditure of money and effort in an endeavor to protect the plants properly.

It is well understood that many plants, and especially roses, require the preservation of a frigid condition about their roots more than protection for cold during winter, although it is also a practice to form sheltering means about the plants to prevent damage from winds at extremely low temperatures, and in the northern localities to protect the plant stalks from extreme frigid weather through the winter. My invention may be used to advantage in conjunction with such methods and apparatus, which do not serve its peculiar functions, because these prior practices still leave the plants subject to the injuries from conditions indicated above. Use of my invention in addition will effect a further notable reduction of winter loss.

With this prior knowledge the practice has developed in the Middle States of leaving rose and other plants uncovered or unguarded until after the ground has become thoroughly frosted or frozen, and then applying an insulating mulch by which this frozen ground is protected from the sun and in some degree protected from access of warm air incident to periods of mild weather occurring before the proper time for the normal growth of the plant. In more northern climes a similar practice is followed, beginning earlier in the season, to avoid similar effects before the winter has fully set in, after which freezing temperatures ordinarily continue for several months, as a rule.

My invention conforms to these practices, and requires no peculiar readjustment of ideas as to protection of plants.

Additional objects, advantages and features of invention reside in the construction, arrangement and combination of parts and steps of procedure involved in the embodiment and practice of my invention, as will be understood from the following description and accompanying drawing, wherein Figure 1 is a perspective view of my mulching ventilator alone, (applied to a rose plant).

Figure 1:
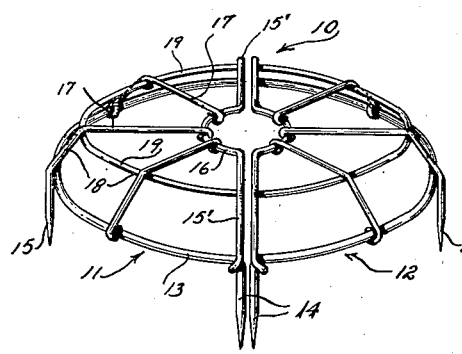
Figure 2:
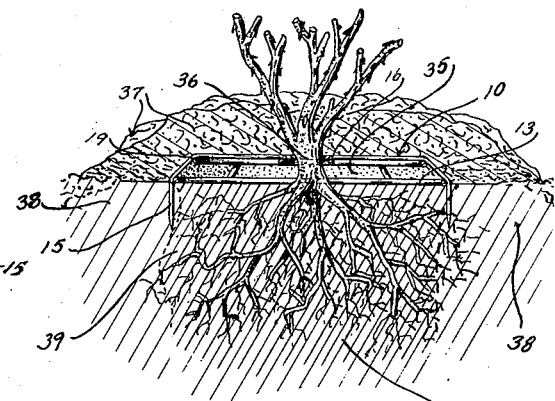
Figure 2 is a cross section thereof, with mulch in place thereover, showing the ground and root structure of the plant, and a portion of the ground surface outwardly of the device.

There is illustrated a device consisting essentially of a cage structure or enclosure 10, which may be formed in any way of fairly open and large mesh woven, or bent wire, including two sections 11 and 12, semi-circular in plan. In the present instance both sections are identically formed and one will be described. It consists of a semi-circular base wire 13 which is preferably of quite thick wire stock, No. 9 steel wire having been used therefor. Each end of this wire is extended and bent downward sharply at right angles to form a rectilinear earth-penetrating spike 14, or steel nail elements may be attached instead at the ends of the wire 13 if desired. An intermediate spike 15 may also be formed or attached integrally with the wire 13 midway of its length. Between the ends of the wire 13 a diametrical wire 15' is extended, welded thereto, or formed integrally as found preferable, and centrally this wire is formed with a semi-circular bow 16, concentric with the base wire 13. Wires 17 extending generally in a radial direction but which may have ornamental convolutions or utilitarian shapes to restrict the spaces between them, are attached to the wires 13 and 15 in conventional manner. These wires lie in a plane offset above the plane of the base wire approximately one inch, extending from the wire 15' to an arc within the wire 13, and are then inclined downwardly as at 18, and joined to the wire 13. The wires 15' and 17 may be of lighter stock than the base wire and have heretofore been formed of No. 12 steel wire. If desired, one or more small diameter wires 19 may be extended across the wires 17 and joined to the wire 15', especially at the outer parts of the device, one being shown at the angle where the inclined part 18 joins the horizontal parts of the wires 17. These wires have been formed of No. 14 wire.

Figure 5:
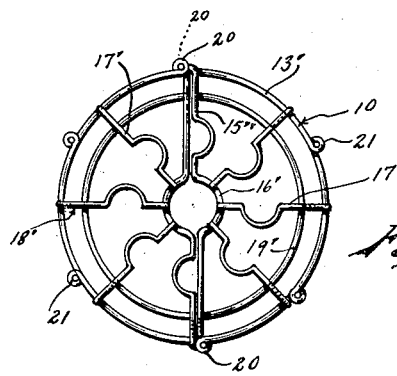
Figure 5 is a plan view of a still further modification.
Figure 6:
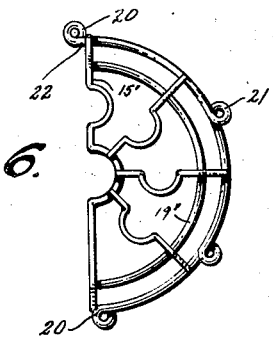
Figure 6 is a similar view of one section of the device shown in Figure 5.

As shown in Figure 5, the base wire 13' corresponding to the wire 13 first described, may be formed with an eye 20 at each end, and—if desired—one or more intermediate eyes 21, all formed by bending of the base wire in familiar ways. These eyes are of a size to receive freely therethrough a ten-penny nail or the like, to be driven into the ground, as will be described. The eye at one side of each section may be formed on a short extension 22 of the base wire, so that this eye may be set over the adjacent eye of the opposite cage section and the two eyes secured by a single nail driven through the two. This will add to the security of the relative positions of the two sections, and minimize the material required and the operations involved in emplacement of the devices. The remaining parts in this modification corresponding to those first described are indicated by the same reference characters with the addition of a prime mark.

The radius of the arc in which the wires 13 lie has been twelve inches for use on average rose bushes, but the size may be varied for larger plants. Generally, it is considered desirable to make it no smaller, for reasons which will appear, or which will be understood by those versed in gardening.

The bow 16 is formed on a radius of about one inch and a half, in the particular size indicated, and this may be used for very small plants as well as larger ones, it being unnecessary, and in fact undesirable, to have the wire at the bow contact the stalk, although contact at one or more points without excessive pressure is not likely to be injurious.

Generally, for small plants, the base of the cage is of sufficient radius to include more than the actual root area of the plant, but for very large plants—and especially for trees—it is not necessary for the device to equal the area of the root-spread of the plant.

The device as constructed is strong enough to support a considerable body of mulch and snow without sagging, as will be understood.

In the use of the appliance as described, two of the sections are adjusted around the base of the stalk, stock, or trunk of the plant or tree, after the ground has become satisfactorily chilled until frozen (or chilled without freezing in those regions where freezing is rare or uncertain). The surface of the soil is first cleared of debris and grass, and levelled, so that a clear space 35 is left under the cage-work.

The radial edge portions of the two sections may be overlapped in order to bring the bow parts 16 into proper close spaced relation to the stalk. It is desirable that the central bow parts be brought to within half an inch of the stalk 36. The spurs 14 are forced or driven into the ground after proper relative adjustment of the sections, a hammer being used if the ground is frozen, and the base wires are adjusted directly upon the ground, so that the upper parts of the wires 17 are spaced closely over the ground. A mulch 37 of suitable depth for the climatic conditions and temperatures of the particular locality is then spread over the cage structure and beyond, so that a proper area of soil 38 is covered around the plant and extending beyond the base of the cage structure a proper distance for the protection required in the outer roots of the plant, and to minimize excessive freezing, or heating, of the earth immediately adjacent the stalk, by conduction from outlying earth. Similarly, it is not desirable to have the radius of the cage made less than indicated, even for extremely small plants, in order to minimize thawing of earth close to the plant by conduction of heat from warmed earth that may lie immediately without the radius of the cage. The mulch may consist of leaves of any kind, and it is an advantage of my invention that maple and other leaves not heretofore found suitable for mulching may be used with my invention with great effectiveness. Straw and other mulch may also be used, alone or mixed with leaves. This mulch is customarily applied to a depth of six to ten inches or more, according to the severity of the winter to be expected. Rose plants may be pruned in accordance with prior practices in conjunction with the use of my invention.

In consequence of the support of the mulch above the ground surface, it does not become embedded in water or slush causing it to pack excessively, but is thoroughly drained and a limited circulation of air thereunder maintained. Owing to the top part of the cage being so close to the ground, and the ground being protected from thawing, mice do not tend to nest thereunder, because a sufficient bedding cannot be belt up by them over the frozen ground 39 and still accommodate the mice under the cage. Mice are not likely to build nests over the cage if the latter is of fairly open structure, because it does not afford a satisfactory support for a nest, but if a nest should be so built, it would not cause material warming of the ground below the cage, due to the intervening space under the nest. Girdling of the trunks of trees by gnawing of mice is consequently less likely to occur.

In cases of extensive garden areas, my cage devices may be adjusted around the plants, and the entire garden area covered with the mulch, those portions immediately around the plants only being raised and air spaces formed thereunder, and the advantages in protecting the plants from premature thawing and otherwise due to my invention will be had.

The cage may be made of woven wire mesh or cloth, such as the common one-half inch mesh screen or quarter-inch mesh wire screen which may be stamped and formed by dies in substantially the form of a pie-plate. While the outer edge portions are indicated as inclined, this is not essential and other forms of outer edge portions may be utilized as desired. The heavy base wire may be omitted, if desired, and in the case of a cage pressed from coarse mesh wire cloth, the extreme edge may be rolled or otherwise formed to afford strength and to receive anchoraging nails or the like.

Figure 3:
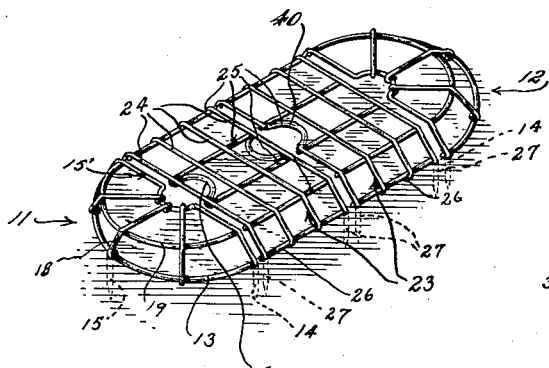
Figure 3 is a view of a modification of the device.

In Figure 3 there is shown a modification of the article in which it is adapted to use in covering long rows of plants, in which two semi-circular end members or sections 11 and 12 are utilized, formed as before described, and between these any desired number of straight sections 23 are adjusted to form a continuous cage of the length required, closed at the ends by sections 11 and 12, but being of open-work throughout and adapted to support mulch thrown thereon. The sections 23 are formed of a series of transverse wires 24 and longitudinal connecting wires 25 with rectilinear base wires 26 at each side. These may be formed with spikes 27 similar to the ones 14, or eyes, as before indicated to receive headed nails or spikes driven therethrough.

Figure 4:
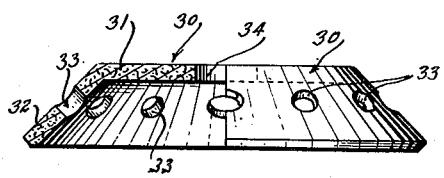
Figure 4 is a view of a further modification.

In Figure 4 there is shown a further modification in which semi-circular sections 30 of fiber pulp stock with fairly thick wall portions are provided. Each section is semi-circular in plan, consisting of a flat top wall 31 and a side wall 32, the latter being sloped downward and outwardly and formed with a series of openings 33 by which the interior is ventilated when in use. The diametrical edges are formed with central notches 34 arranged so as to register when the two sections are brought together and accommodate the stalk of a plant over the roots of which the body portions are arranged. The side walls are of a height approximately one inch, more or less, so that the flat top wall is supported in very close spaced relation to the ground surface, and the lower edge portions of the side walls may be thickened or otherwise reinforced if desired, as well as other reinforcement employed as may be found desirable.

In the production of the last described form of the article it is contemplated to use wood pulp or other fiber which may be impregnated with materials to discourage gnawing by rodents and is preferably shaped with a minimum of pressure to enhance its insulating value. It may be used in substantially the same manner as the cage form, although it will have additional insulating value, as will be appreciated. This device is distinguished from appliances for enclosing an entire plant in the features of its height from the ground surface, its ventilation, its area related to the root system of the plant, its adaptability to support the mulch free of the ground, as above explained, and otherwise.

An important advantage of my device in its several forms is its adaptation to be nested for packing, storage, and shipment, so that a minimum of space is required for accommodation of a large number of units, as well as its lightness, and its freedom from deterioration, wear, and liability to damage under severe use. Thus, it is not likely to corrode objectionably even if made of ordinary steel wire, but it may be dipped in protective coatings at slight cost to minimize such effect, or may be formed of corrosion resistant metals or alloys. In case of deformation as might happen by wagon wheels passing thereover, it may be reshaped manually by unskilled persons and its effectiveness restored.

It is an advantage of my invention that it is adapted to protect roots of plants from damage by passage of lawn mowers, wheel-barrows or the like over the roots of the plants, and it will also prevent scratching away of loam from around roots by chickens, dogs, or other creatures, as well as discourage field-mice from frequenting the bases of plants, and for such purposes, may be left in place throughout the year, except when cultivation directly adjacent the plants is required.

The form shown in Figure 4 has a further advantage for all-year use, consisting of the fact that it may be left in place without interfering with growth of the plant, will not interfere with application of sprays, pruning and cutting of blooms or gathering of a crop, and is also so low to the ground that it will not interfere with mowing. It also permits cultivation without its removal within certain limits around the plant. By leaving it in place the ground is kept from baking, and weed growth under the device is discouraged if not prevented. In case cultivation close to the plant is required within the boundary of the guard and ventilator, this may be accomplished to some extent by running the cultivator close to the edge of the device, which will loosen the earth under the device, and a hand hoe may also be so used as to loosen the earth under the device without requiring its removal. However, removal may be effected very quickly by a mere lifting of the article, in case of need, and it may readily be replaced by a reverse operation.

Where the device is used merely as a winter mulch support and ventilator, it may be removed and stored during the summer in nested relation, in stacks occupying very little space.

After one method of use, the device may be removed after removal of the mulch, or when unrestricted growth of the plant is safe, in the spring, and after early cultivation and fertilization, replaced as a guard for the remainder of the season and allowed to remain through the winter, being covered with mulch after the first good freeze. In the case of the pulp device, the apertures therein will permit effective freezing of the ground thereunder, and when the mulch is applied, there will still be a limited access of air from the exterior, sufficient to keep the ground adequately chilled, yet preventing severe freezing by excessively low temperatures.

Presence of a body of snow over the mulch will contribute to the maintenance of the chilled condition of the ground under my device, both by circulation through the ventilator of air chilled by the snow, as well as by deflecting the sun's rays from the mulch thereover, and by the passage over the ground surface under the ventilator of water from the melting snow and approximately at the temperature of ice.

Without my appliance the packing and wetting effect of the snow would press the mulch upon the ground and favor its decomposition by growth of fungus and by fermentation, the latter developing undesired heat, and the wetting and packing of the mass favoring the conduction of heat from the sun's rays and also by absorbing and transmitting heat from warm air currents in the atmosphere. When the mass lies on the ground it tends to retain the excess moisture by which development of a too effective conduction of heat is facilitated and decomposition aided.

By preventing the packing and decaying of the mulch, and also by elevating the mulch, my invention discourages the breeding of insects, or the wintering thereof adjacent the protected plant, and by reason of the healthier condition of the plant root crown, access of insects thereto is discouraged.

There is also an advantage in my invention in preventing the formation of a packed mass of mulch and water as often occurs followed by freezing of the mass, with resultant lack of ventilation and other injurious effects, some consequent on the action of the ice and some due to lack of ventilation, among which is the tendency to thaw under the ice. Not the least important is the obviation of communication of diseases from rotted leaves and/or manure.

It will be appreciated that the pulp body device will function in a novel way to keep the mulch from becoming excessively wet and from becoming packed and/or decayed, and also in its protection of the plants. Thus, the fibrous body of the article will absorb water from the superposed mulch and convey it laterally and downward to the ground a distance from the plant, by capillary action and gravity, causing the mulch to retain its strength of structure, its open condition, and good insulating qualities. At the same time, in case of very warm weather, the body of the article will serve as a heat insulation for the plant and root area while still permitting moderate ventilation, especially at night when cold air may enter in sufficient volume to maintain or renew the frigidity of the ground.

I am aware of practices and devices such as indicated in the patents listed below, and do not wish to claim the apparatus nor the practices and indicated uses in such patents, all of which singly and together fail to provide for the protection of plants in the same way as in my invention, and do not have the same advantages in many of the respects attained by my invention; Fisher, No. 42,176, April 5, 1864; Brunson, No. 104,418, 1870; Merriam, No. 617,034, 1899; Scott, No. 912,184, 1909; Bauer, No. 1,198,178, 1916; Sleen, No. 1,453,810, 1923; and Picard No. 1,959,875, 1934.

By placing a slow-vaporizing crystal or other product adapted to evolve poisonous gas on the earth under my cage, the device or the device and mulch will operate to confine the gases around the roots of the plant when the mulch is in place, exterminating earth and root boring insects as well as other insects and rodents.

Horticulturalists will appreciate the applicability of my device and method to various plants and trees including many which do not have stalks or trunks extending above the ground a material distance. For instance, my device may be employed in protecting strawberry plants from too severe freezing as well as from the effects of premature thawing of the ground therearound, whether they be used in rows or hills. In the hill system my units of circular form and appropriate size may be positioned over respective hills in accordance with customary practices in mulching the plants, in consequence of which the mulch is supported above the crowns of the plants so that wet, packed mulch does not rest upon the plants and tend to cause rot, but an air space is preserved over the plants and roots with sufficient ventilation, and the plants are protected from premature heating by the sun or warm air, as above indicated.

It will be understood that while I have disclosed a specific embodiment of the invention, nevertheless, this is purely exemplary and various modifications in structure, and proportions may be made in the device without departing from the spirit of the invention, as more particularly set forth in the appended claims, wherein The outermost cross wire 24' at one side of each section 23 may have a semicircular bight 40 formed midway thereof, while the wire 24 at the opposite side may be straight. In case of closely spaced plants in a row, the stalks may be adjusted in the semicircular openings thus provided, as the sections are put in place. In case of a row of plants with more widely spaced and larger stalks, one section may be reversed, side for side so as to bring its bight into opposition with that of the next section and the two adjusted with their bights around the plant stalk, affording a larger opening therefor. Also, if desired, the sections 23 may have straight cross wires at both sides, and inwardly of one or each of these on each section a semicircular bight piece 41 may be provided, so that by cutting out the central part of a cross wire with an ordinary wire cutter, the bight previously closed thereby will be exposed to receive a stalk. Under the arrangement at 40, the open side of the bight will be closed by the straight wire 24 of the next section when all sections 23 are arranged one way, so that ample support for mulch is afforded, but in case of need, one section may be rotated horizontally half a turn and so bring two bights into opposition and the larger circular opening is formed.

I claim:

1. A device of the character described consisting of a support structure formed in two sections adapted to be adjusted to a plant to form a unit having ground-engaging edge portions and a top portion substantially planiform and spaced above the plane of the ground-engaging portions at an exceedingly low level whereby rodent nest building is prevented over frozen ground, and constructed to receive and support thereon mulch of the character described.

2. A device of the character described consisting of two sections constructed to be adjusted spacedly to a plant stalk and the like to form a continuous annular unit structure having a substantially planiform top portion and edge portions adapted to engage the earth surface and support the top portion in exceedingly close spaced relation to the earth surface for the purposes described, and being foraminate at least in part for ventilation, and being constructed of material capable of sustaining a body of mulch and snow clear of the ground, for the purposes described.

3. The article of claim 1 in which said device is formed of reticulated wire mesh material.

4. The article of claim 1 in which said device is formed of plastic fiber pulp of open structure having high heat insulating value, but foraminate on its side portions at least for limited ventilation.

5. The structure of claim 1 in which said ground engaging edge portions have eye elements formed therein, and nail spike elements having shanks freely slidable through the eye elements, whereby the nail spike elements may be inserted therethrough and driven into frozen ground.

6. The structure of claim 1 in which each section includes a heavy wire bent to semi-circular form, a diametrical wire element having a central bowed part concentric with the base wire, but at a higher level, and having ends inclined downwardly to the base wire, a plurality of radial wires connected between the two having inner portions in a common plane with the inner portions of said diametrical wire and downwardly inclined outer end portions attached to the first named wire, and wire elements to restrict the spaces between the radial wires.

7. The structure of claim 1 in which each section includes an upper substantially planiform portion of open wire network, and said base wire is formed with eyes therein projected outwardly and set in a common base plane.

8. The structure of claim 1 in which each section includes an upper substantially planiform portion of open wire network and said base wire is formed with eyes therein projected outwardly and set in a common base plane, the base wire in each section having one end extended across a diametrical plane of the device and having one eye formed on the extremity of said extended end, and the other end of the base wire having an eye formed thereon inwardly of said plane.

9. The method of protecting plants from winter-killing and other injury consisting in growing plants in normal manner, allowing the ground to remain exposed during the early part of the winter until chilled to a desired maximum, thereafter forming over the earth immediately adjacent the stock of the plant an enclosure open for ventilation, and having a very low central portion, and placing over the enclosure a mulch for insulation and restriction of air flow and for ventilation and drainage of the mulch adjacent the plant for the purposes described.

10. A device of the character described consisting of a unit structure having a substantially flat top portion and downwardly extended edge portions adapted to engage the surface of the earth in supporting relation, the altitude of the top portion being comparatively slight whereby the top will lie in exceedingly close relation to the earth surface for the purposes described, said unit being constructed of materials and form capable of supporting a body of mulch clear of the ground, and being foraminate at least in part for limited ventilation under mulch, all for the purposes described.

11. In a device of the character described, a plurality of cage sections including end sections and intermediate transverse sections constructed to be assembled to form an elongated chamber over a row of plants and the like, the intermediate sections each having a straight side transverse to the chamber and a centrally recessed opposite side.

12. In a device of the character described, a plurality of cage sections including end sections and intermediate row sections constructed and adapted to be assembled in a series to form an elongated chamber, certain transverse edges of the sections having central bights adapted to be closed by straight members of opposed sections and when reversed in relative positions to register with the like bight of an opposed section.

13. The structure of claim 12 wherein a straight severable bar element extends across each bight forming a part of the section edge.

FRED C. HOOVER.